United States Patent Office 2,876,216
Patented Mar. 3, 1959

2,876,216

DIALKYLIDENE FIVE-MEMBERED HETEROCYCLIC COMPOUNDS AND POLYMERS THEREOF

John Lynde Anderson and Hilmer Ernest Winberg, Wilmington, Del., assignors to E. I. du Pont de Nemours & Company, Wilmington, Del., a corporation of Delaware No Drawing. Application September 24, 1953
Serial No. 382,222

3 Claims. (Cl. 260—88.3)

This invention relates to monomeric compounds and their polymers and, more particularly, to certain dialkylidene heterocyclic compounds having conjugated double bonds, and to polymers thereof.

Numerous polymerizable unsaturated organic compounds are known and many of them have been polymerized into useful, high molecular weight products. Such unsaturated compounds and their polymers are useful in various applications, e. g., the monomers as chemical intermediates and the polymers as adhesives, coating compositions, plastics, and the like. All these known unsaturated compounds and their polymers are not useful for the same purposes since differences in the structure of the monomers imparts different properties to the final product. In view of these differences in individual characteristics of the different unsaturated monomers and polymers, it is highly desirable to develop still other unsaturated compounds, especially unsaturated monomers having heterocyclic structural units, in order to produce new products having specific properties or combinations of properties which would make them especially desirable in certain specific applications.

An object of the present invention is to provide a new class of heterocyclic compounds. A further object is to provide a new class of monomeric dialkylidene heterocyclic compounds having conjugated double bonds, and polymers thereof. Other objects will be apparent from the description of the invention given hereinafter.

The above objects are accomplished according to the present invention by providing as a new class of dialkylidene heterocyclic compounds, dialkylidene five-membered heterocyclic compounds having in the 1-position of the heterocyclic ring an oxygen or sulfur joined to two annular carbons, and having attached to one of two carbons in any of the 2,5-, 2,3-, and 4,5-positions of the heterocyclic ring a =CH$_2$ group and to the other of these two carbons a =CHR' group wherein R' is hydrogen or a straight chain alkyl radical of 1 to 4 carbons, inclusive, the heterocyclic ring containing a double bond. In the most preferred class of compounds, a methylene group is attached to each of the two carbons in question, that is, R' above is hydrogen.

A preferred group of these new compounds are those having the formula

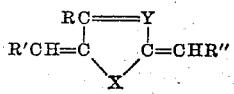

wherein X is oxygen or sulfur; Y is CR or nitrogen; R is hydrogen or an alkyl radical; and one of R' and R'' is hydrogen or a straight chain alkyl radical of 1–4 carbons and the other is hydrogen. Preferably, both R' and R'' are hydrogen. In the above compounds, the alkylidene groups are attached to the carbons in the 2,5-positions of the heterocyclic ring.

Also, included in this new class of compounds are the isomers of the compounds represented by the above formula, namely, those compounds represented by the formula

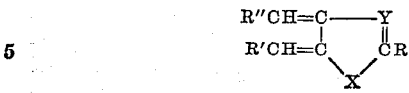

wherein the various symbols have the meaning above. In this instance, it is immaterial whether the two alkylidene groups are regarded as being attached to the two carbons in the 2,3- or the 4,5-positions of the heterocyclic ring inasmuch as the compounds having the alkylidene groups in corresponding positions with respect to the hetero atom X, i. e., in the 2- or 5- and the 3- or 4-positions, would be identical in both cases.

The compounds of this invention are characterized by containing conjugated double bonds inasmuch as they have two alkylidene groups attached to carbons of the heterocyclic ring and the heterocyclic ring contains a double bond. The monomeric compounds are spontaneously polymerizable at ordinary and moderately elevated temperatures.

These compounds can be prepared by pyrolyzing a five-membered heterocyclic quaternary ammonium hydroxide having in the 1-position of the heterocyclic ring an oxygen or sulfur joined to two annular carbons, having attached to one of two carbons in any of the 2,5-, 2,3-, and 4,5-positions of the heterocyclic ring a —CH$_2$N(CH$_3$)$_3$OH group and to the other of these two carbons a —CH$_2$R group, R being hydrogen or an alkyl radical, and having two conjugated double bonds in the heterocyclic ring.

The preparation of the compounds of this invention by this method is illustrated in the examples below and is described and claimed in U. S. application Serial No. 382,223, entitled "Preparation Of Organic Compounds," and filed of even date herewith in the name of Hilmer Ernest Winberg.

This pyrolysis can be carried out over a temperature range of about 25° C. to 200° C., depending on the specific quaternary ammonium hydroxide being pyrolyzed. Some of these hydroxides are relatively unstable and may be pyrolyzed at temperatures as low as 25° C. or 30° C. Others are more stable and require temperatures in the range of 50° C. to 150° C. to produce a practical rate of pyrolysis, while still others can be pyrolyzed at temperatures up to 200° C. or even somewhat higher to advantage. The pressure at which the pyrolysis is carried out, is not critical and can range from as low as 1 mm. of mercury up to atmospheric pressure.

The dialkylidene compounds formed by the pyrolysis are spontaneously polymerizable, some even at room temperature. Where the polymer of the dialkylidene compound is desired, the fact the monomer may polymerize spontaneously is immaterial. However, when the dialkylidene compound is desired in monomeric form, particularly where the compound is spontaneously polymerizable at room temperature, it is preferred to carry out the pyrolysis under reduced pressure, generally at a pressure not greater than 150 mm. of mercury and, preferably, at a pressure of 1 mm. to 100 mm. of mercury, remove the volatile monomer rapidly from the reaction zone, condense it at low temperature to keep the formation of polymer at a minimum, and then isolate the monomer from other volatile products which have been condensed with it. Condensing and maintaining the monomer at 0° C. or lower is advisable and, it is preferred to condense the monomer at a temperature below —50° C. such as can be conveniently provided by a solid carbon dioxide-acetone mixture.

A preferred method of carrying out this pyrolysis, using 5-methyl-2-furfuryltrimethylammonium hydroxide as an illustration, is as follows: the 5-methyl-2-furfuryltrimethylammonium hydroxide is heated to a temperature between 50° C. and 150° C. at a pressure of 1 to 150 mm. of mercury and the volatile reaction products collected in a cold receiver, e. g., a trap cooled by solid carbon dioxide-acetone mixture. The monomeric compound, 2,5-dimethylene-2,5-dihydrofuran, in the cold receiver is dissolved in an organic solvent, e. g., diethyl ether, and dried by a solid desiccating agent, e. g., anhydrous magnesium sulfate. The organic solvent solution of the monomeric product is used directly if it is desired to make chemical derivatives of the monomer. When the solution is allowed to warm to room temperature or the solvent is removed by evaporation at room temperature or moderately elevated temperatures, the monomeric 2,5-dimethylene-2,5-dihydrofuran polymerizes spontaneously with the liberation of heat. The resulting polymeric product varies from a soft, tacky resin to a hard, high molecular weight polymer. The polymeric product can be purified by extraction with water or organic liquids which are not solvents for the polymer.

The heterocyclic quaternary ammonium hydroxides used as starting materials in the preparation of the products of this invention, can be obtained from the corresponding quaternary ammonium halides by reaction with silver oxide as described in detail in copending application Serial No. 382,221, filed of even date herewith in the name of Hilmer Ernest Winberg and entitled "Organic Compounds," now abandoned, or by other known methods.

Another method of preparing certain of the compounds of this invention is disclosed and claimed in U. S. application Serial No. 382,187, entitled "Pyrolysis of Organic Compounds" and filed of even date herewith in the name of John Lynde Anderson, now U. S. 2,756,239. This procedure is adapted to prepare only those compounds where both alkylidene radicals are methylene and are attached to the two carbons in the 2,5-positions of the heterocyclic ring and four members of the five-membered heterocyclic ring are carbons. It involves pyrolyzing an ethyl methyl-substituted five-membered heterocyclic compound having the formula

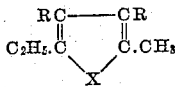

wherein X is oxygen or sulfur; and R is hydrogen or an alkyl radical.

Upon pyrolysis of an ethyl methyl-substituted compound as above, it has been found that the carbon-carbon bond of the ethyl substituent is cleaved and a demethanation takes place. As a result, dialkylidene compounds are formed wherein a methylene group is attached to each of the two carbons in the 2,5-positions of the heterocyclic ring.

A preferred manner of carrying out this pyrolysis comprises passing the ethyl methyl-substituted compound of aromatic nature through a reaction zone at a temperature of 725° C.–900° C., preferably 800° C.–825° C., and rapidly cooling the reaction products of the pyrolysis, preferably to a temperature below about −50° C. and, when the dialkylidene compound formed is relatively unstable and it is desired to isolate it in monomeric form, to an even lower temperature.

The pressure at which the pyrolysis is carried out is not critical. However, it is preferred to use a pressure of about 20 mm. of mercury or less. Especially good results are obtained when the pressure in the system (measured at a point following the cold receiver) is maintained at less than one micron mercury pressure.

The reaction time, i. e., the length of time the ethyl methyl-substituted aromatic compound is subjected to the pyrolyzing temperature of 725° C. to 900° C., is not critical and can be varied over wide limits. When the pyrolysis is carried out under very high vacuum, i. e., at pressures of less than one micron of mercury, the reaction time is very short, e. g., of the order of one second or less. At higher pressures the reaction time can be longer. The longest reaction times are required when the pyrolysis is carried out at higher pressures and at lower temperatures in the above-specified range.

The pyrolysis can be carried out in reaction vessels of any inert material. The use of a filler or packing material in the reaction vessel is not essential but it is preferable in order to provide better heat transfer. Any inert granular material is suitable for this use. The reaction vessel is conveniently constructed in the form of a cylindrical tube and can be made of any inert, heat-resisting material such as, for example, heat resistant glass, quartz or inert metal. Granular quartz is a satisfactory filler for the reaction tube. The reaction tube is heated externally by any convenient means, e. g., by an electrical coil heater.

The reaction products are led directly from the reaction zone into a cold receiver. The temperature at which the receiver is maintained, is dependent on the particular dimethylene-substituted product being prepared and on whether the product is desired in the monomeric or polymeric form. Generally, the receiver should be cooled to at least −50° C. to isolate products of normal stability while a temperature of liquid air or liquid nitrogen is required when less stable products are to be isolated in monomeric form. For example, in the pyrolysis of 5-ethyl-2-methylthiophene the monomeric product can be isolated in a receiver cooled to the temperature of a mixture of solid carbon dioxide and acetone but when a less stable monomer is being isolated, in monomeric form, the receiver is preferably cooled by a liquid air or liquid nitrogen bath.

The less reactive monomers of this invention can be isolated and purified by distillation at low pressures. The polymeric products can be purified by conventional methods, e. g., by extraction with liquids which are solvents for impurities but not solvents for the polymer, or by solution in a liquid which is a solvent for the polymer followed by its crystallization from the solution.

The following examples in which all proportions are by weight unless otherwise stated, illustrate specific embodiments of the present invention.

*Example I*

An aqueous solution of 5-methyl-2-furfuryltrimethylammonium hydroxide (prepared from 11.7 parts of 5-methyl-2-furfuryltrimethylammonium bromide and 16 parts of silver oxide) is heated at a pressure ranging from about 30 mm. down to about 3 mm. of mercury at a maximum temperature of 30° C. to remove the water. The solid residue is then heated at 150° C. at 3–4 mm. pressure for a period of 20 minutes in a reaction vessel connected to a receiver cooled in a mixture of solid carbon dioxide and acetone. The product collected in the cold receiver is a white solid which, on warming, turns to a light yellow liquid which is 2,5-dimethylene-2,5-dihydrofuran. This liquid is dissolved in diethyl ether and dried with anhydrous magnesium sulfate.

The ether solution of monomeric 2,5-dimethylene-2,5-dihydrofuran is heated to boiling whereupon the monomer polymerizes exothermically. The resulting solid polymer of 2,5-dimethylene-2,5-dihydrofuran is filtered from the ether solution and dried. This polymer softens to a viscous melt at 120–125° C. It is swollen by boiling benzene and by dimethylformamide.

*Analysis.*—Calcd. for $(C_6H_6O)_x$: C, 76.57%; H, 6.43%. Found: C, 75.63%, 75.85%; H, 6.26%, 6.33%.

*Example II*

An aqueous solution of 5-methyl-2-thenyltrimethylammonium hydroxide (prepared from 23 parts of 5-methyl-2-thenyltrimethylammonium chloride and 15.5 parts of silver oxide) is subjected to a temperature of 30° C. (maximum) at a pressure of 30–3 mm. of mercury to remove the water. The residue is then heated at 150° C. and 3 mm. mercury pressure for 10 minutes. The residue in the reaction flask, a polymer of 2,5-dimethylene-2,5-dihydrothiophene, is extracted twice with boiling water, dried and extracted with hexane. The solid polymer softens above 140° C. and becomes rubbery at 220° C. It is insoluble in boiling toluene, carbon tetrachloride, carbon disulfide or dimethylformamide.

Analysis.—Calcd. for $(C_6H_6S)_x$: C, 65.44%; H, 5.49%; S, 29.06%. Found: C, 64.98%, 64.98%; H, 5.52%, 5.53%; S, 28.49%.

*Example III*

An aqueous solution of 4,5-dimethyl-2-thiazylmethyltrimethylammonium hydroxide (prepared from 6.8 parts of 4,5-dimethyl-2-thiazylmethyltrimethylammonium chloride and 7 parts of silver oxide) is heated under a pressure of 30–3 mm. mercury at a maximum temperature of 30° C. to remove water. The residue is heated at 150° C. and 3 mm. mercury pressure for a period of one-half hour. The residue is extracted with boiling water. The resulting product is a polymer of 2,5-dimethylene-4-methyl-2,5-dihydrothiazole and is a soft, tacky resin.

*Example IV*

An aqueous solution of 5-ethyl-2-furfuryltrimethylammonium hydroxide (prepared from 29.5 parts of 5-ethyl-2-furfuryltrimethylammonium iodide and 23 parts of silver oxide) is heated at a maximum temperature of 30° C. at a pressure of 30–3 mm. mercury to remove the water. The residue is heated at 50° C. to 100° C. under 150 to 3 mm. pressure until decomposition is complete. The volatile decomposition products are collected in a receiver cooled with solid carbon dioxide and acetone. The volatile products collected in the receiver are extracted with diethyl ether and the extract dried with anhydrous magnesium sulfate. This ether solution contains monomeric 5-ethylidene-2-methylene-2,5-dihydrofuran.

The ether in the above solution is removed by distillation and the residue is heated to about 100° C. The resulting polymeric residue is extracted with absolute alcohol. There is obtained a rubbery, white, insoluble solid which is believed to be a polymer of 5-ethylidene-2-methylene-2,5-dihydrofuran. This polymer softens to a viscous melt at 70° C.

*Example V*

An aqueous solution of 3-methyl-2-thenyltrimethylammonium hydroxide (prepared from 20.6 parts of 3-methyl-2-thenyltrimethylammonium chloride and 23.1 parts of silver oxide) is heated at a maximum temperature of 30° C. at a pressure ranging from 30 mm. to 3 mm. of mercury to remove the water. The residue is heated up to a temperature of 150° C. at a pressure of 3–6 mm. of mercury until the evolution of trimethylamine ceases. The volatile decomposition products are collected in a receiver cooled by a solid carbon dioxide-acetone mixture. A polymer of 2,3-dimethylene-2,3-dihydrothiophene forms as a white opaque film in the receiver. This polymer becomes transparent when heated above 70° C. It does not melt below 160° C.

Analysis.—Calcd. for $(C_6H_6S)_x$: C, 65.44%; H, 5.49%. Found: C, 65.05%, 64.90%; H, 5.49%, 5.58%.

The foregoing examples illustrate the preparation of compounds of this invention by pyrolysis of heterocyclic quaternary ammonium hydroxides. The following example illustrates the preparation of the polymer of 2,5-dimethylene-2,5-dihydrothiophene by pyrolysis of an ethyl methyl-substituted heterocyclic compound of aromatic nature.

*Example VI*

One gram of 5-ethyl-2-methylthiophene is distilled through a cylindrical quartz tube (1″ x 12″) filled with quartz packing and heated at 825° C., and led into a trap cooled by liquid nitrogen. The system is maintained at a pressure of less than 1 micron of mercury (measured between the trap and the vacuum pump) and the distillation of the 5-ethyl-2-methylthiophene through the system requires thirty minutes. The yellow condensate in this trap melts on warming and is redistilled to an adjacent trap also cooled by liquid nitrogen. On this distillation a small amount of a dark residue remains in the first trap. The distilled product is remelted and redistilled in vacuum two more times. In both cases a small amount of colorless solid remains in the trap from which the liquid is distilled. On warming to room temperature the redistilled product polymerizes rapidly with the deposition of a colorless solid and the loss of the yellow color in the supernatant liquid. This solid is a polymer of 2,5-dimethylene-2,5-dihydrothiophene. It is partially soluble in hot hydrocarbon solvents, e. g., benzene, and is reprecipitated on cooling. In duplicate runs similar products give infrared absorption spectra which confirm the presence of the disubstituted thiophene structure. Element analyses confirm the empirical formula $(C_6H_6S)_x$.

Calculated: C, 65.5%; H, 5.45%. Found: C, 66.85%; H, 5.64%.

This polymer of 2,5-dimethylene-2,5-dihydrothiophene can be melt pressed into tough films.

It will be understood that the above examples are merely illustrative and that the invention broadly comprises, as a new class of compounds, dialkylidene five-membered heterocyclic compounds having in the 1-position of the heterocyclic ring an oxygen or sulfur joined to two annular carbons, and having attached to one of two carbons in any of the 2,5-, 2,3-, and 4,5-positions of the heterocyclic ring a =CH₂ group and to the other of these two carbons a =CHR' group wherein R' is hydrogen or an alkyl radical, the heterocyclic ring containing a double bond.

All of the compounds falling within the above class are characterized by having conjugated double bonds and being readily polymerizable. Specific compounds falling within this class, other than those shown in the examples, include 3-methyl-2-methylene-5-propylidene-2,5-dihydrofuran and its polymers, 4-tert.-butyl-2,5-dimethylene-2,5-dihydrofuran and its polymers, and 2,3-dimethylene-2,3-dihydrofuran and its polymers. All of these compounds can be prepared by pyrolysis of the corresponding quaternary ammonium hydroxides and those compounds having four carbons in the heterocyclic ring with methylene groups attached to the two carbons in the 2,5-positions can also be prepared by pyrolysis of the corresponding ethyl methyl-substituted five-membered heterocyclic compounds.

The polymeric products of this invention are linear addition polymers and, as shown by the examples, can be readily prepared without the use of polymerization initiators. It is believed that reversion of the monomeric dialkylidene heterocyclic compounds to the "aromatic" ring system takes place on polymerization. That is, the polymerization is believed to take place in accordance with the following equation for the polymerization of 2,5-dimethylene-2,5-dihydrofuran:

The products of this invention are useful for various purposes. The monomeric dialkylidene heterocyclic compounds are useful as chemical intermediates. For example, a cold ether solution of 2,5-dimethylene-2,5-dihydrofuran can be reacted with iodine to give the 2,5- bis(iodomethyl) furan. This diiodo compound can in turn be reacted with trimethylamine to form 2,5-furandimethylenebis(trimethylammonium iodide). The monomeric 2,5-dialkylidene-2,5-dihydroheterocyclic compounds can also be converted to cyclic dimers by heating the monomers in the presence of a polymerization inhibitor as described in further detail in application Serial No. 382,224, filed of even date herewith in the name of Hilmer Ernest Winberg, and entitled "Cyclic Dimers of Organic Compounds," now abandoned, a continuation-in-part of which having been filed on January 21, 1958, as Serial No. 710,182. The polymers of this invention are useful in such applications as adhesives, coating compositions, plastics, films, and fibers.

As many apparently widely different embodiments of this invention may be made without departing from the spirit and scope thereof, it is to be understood that the invention is not limited to the specific embodiments thereof except as defined in the appended claims.

The invention claimed is:

1. A dialkylidene heterocyclic compound selected from the group consisting of compounds having the formula

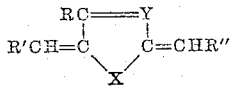

and compounds having the formula

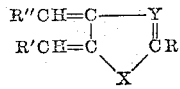

wherein X is selected from the group consisting of oxygen and sulfur; Y is from the group consisting of CR and nitrogen, provided, however, that when X is oxygen Y must be CR; R is from the group consisting of hydrogen and alkyl radicals of 1 to 4 carbons; and one of R′ and R″ is from the group consisting of hydrogen and straight chain alkyl radicals of 1 to 4 carbons, inclusive, and the other is hydrogen, said compound being further characterized by being unstable at 25° C., stable at temperatures below −50° C., and readily polymerizable at temperatures of 25° C. and higher.

2. A dialkylidene five-membered heterocyclic compound as set forth in claim 1 wherein R′ is hydrogen.
3. A linear homopolymer of a compound as defined in claim 1.
4. 2,5-dimethylene-2,5-dihydrofuran.
5. 2,5-dimethylene-2,5-dihydrothiophene.
6. 2,5-dimethylene-4-methyl-2,5-dihydrothiazole.
7. 5-ethylidene-2-methylene-2,5-dihydrofuran.
8. 2,3-dimethylene-2,3-dihydrothiophene.

References Cited in the file of this patent
UNITED STATES PATENTS

| | | |
|---|---|---|
| 2,369,371 | Seiberlich | Feb. 13, 1945 |
| 2,431,216 | Wagner | Nov. 18, 1947 |
| 2,527,714 | Dunlop | Oct. 31, 1950 |
| 2,556,419 | Emerson | June 12, 1951 |
| 2,624,723 | McGraw | Jan. 6, 1953 |
| 2,667,496 | Harban | Jan. 26, 1954 |
| 2,710,870 | Lawson | June 14, 1955 |